June 4, 1929.  C. E. BURRELL  1,716,259
MOTOR VEHICLE HEATER
Filed May 4, 1927   2 Sheets-Sheet 1
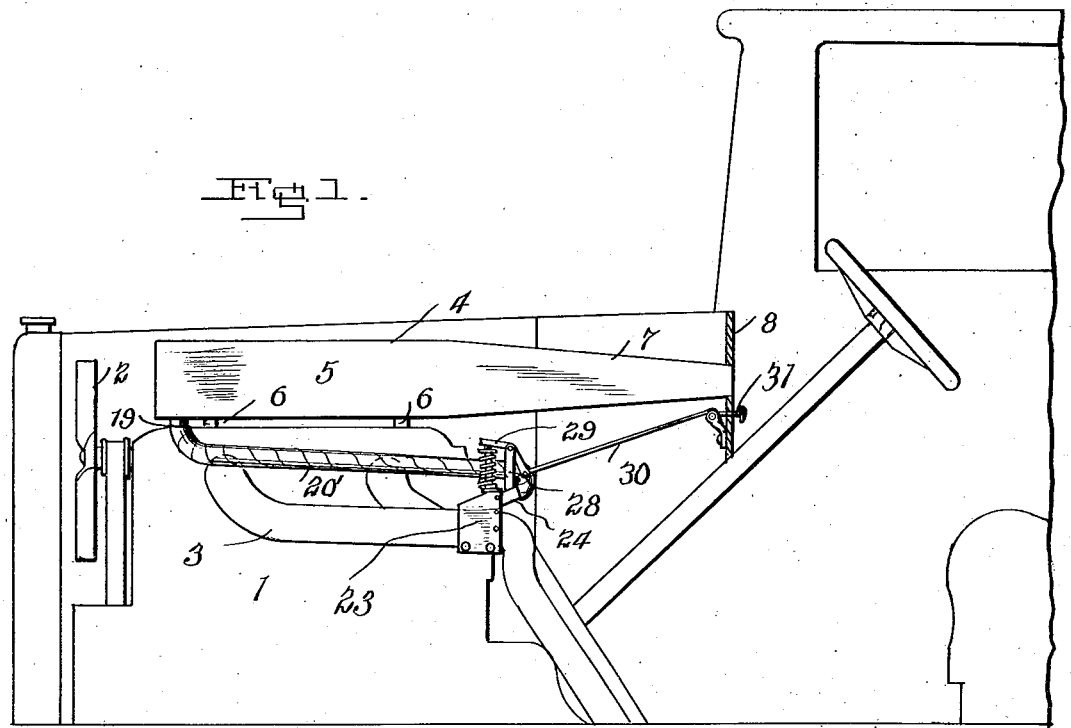
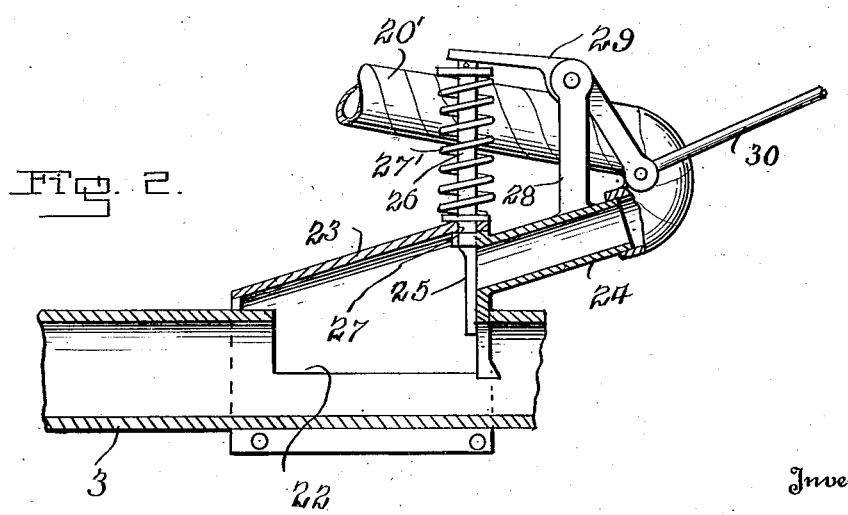
Inventor
C. E. Burrell
By Lacey & Lacey, Attorneys

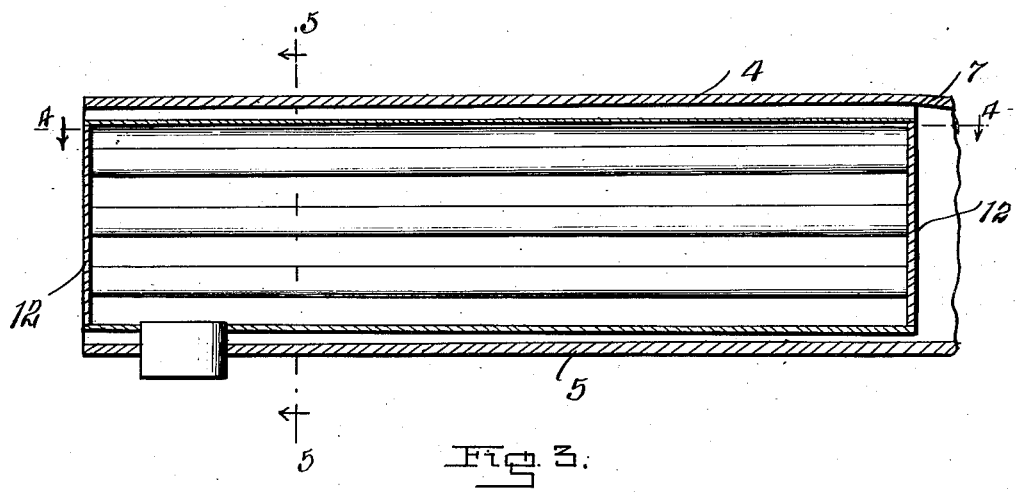
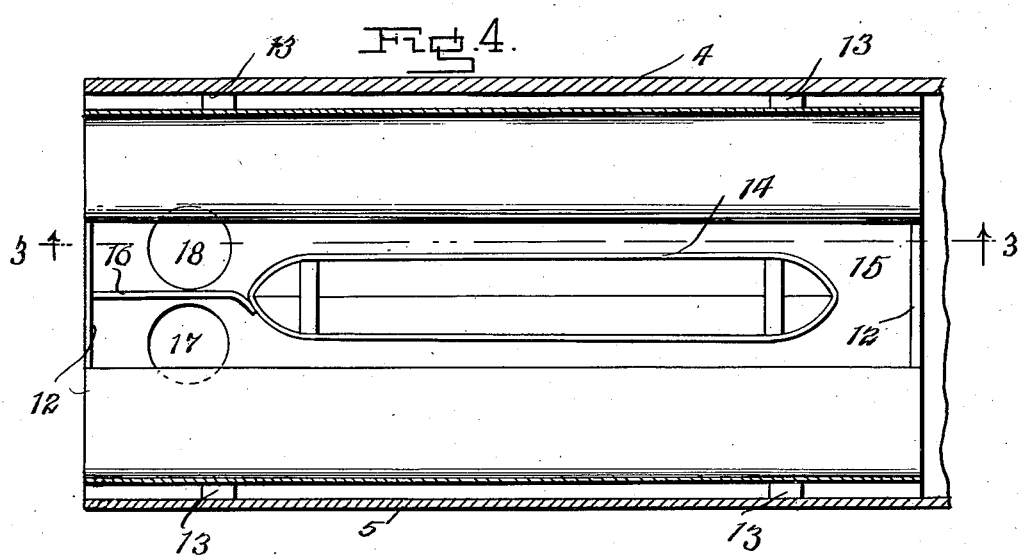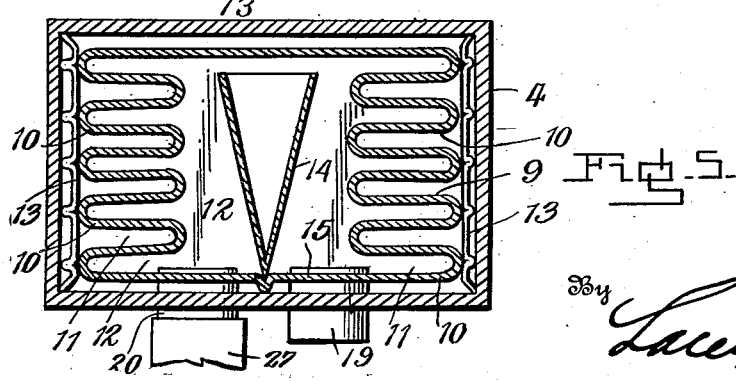

Patented June 4, 1929.

1,716,259

UNITED STATES PATENT OFFICE.

CHARLES E. BURRELL, OF SHAMOKIN, PENNSYLVANIA.

MOTOR-VEHICLE HEATER.

Application filed May 4, 1927. Serial No. 188,812.

The present invention is directed to improvements in heaters for motor vehicles.

The primary object of the invention is to provide a device of this kind which can be conveniently mounted on the engine of the vehicle in order that the exhaust gases therefrom can be utilized as a heating medium.

Another object of the invention is to provide a heater of this kind comprising a radiator provided with corrugations so arranged that a maximum radiating surface is produced.

Another object of the invention is to provide a heater for the purpose specified which is so constructed that the fan of the engine will aid in forcing fresh air through the heater in a circuitous path to insure thorough heating thereof before entering the body of the vehicle.

With these and other objects in view, the invention resides in the novel features of construction, formation, combination and arrangement of parts to be hereinafter more fully described, claimed and illustrated in the accompanying drawings, in which,—

Figure 1 is a side elevation of the device showing it in place upon the engine of a motor vehicle.

Figure 2 is a vertical longitudinal sectional view through the valve for controlling the flow of exhaust gases to the heater.

Figure 3 is a sectional view on line 3—3 of Figure 4.

Figure 4 is a sectional view on line 4—4 of Figure 3.

Figure 5 is a sectional view on line 5—5 of Figure 3.

Referring to the drawings, 1 designates the engine of a motor vehicle which as usual, is provided with the fan 2 and exhaust pipe 3.

The heater is designated generally by the numeral 4 and comprises a casing 5, preferably rectangular in cross section, said casing being supported upon the engine by brackets 6. The rear end of the casing terminates in a tapered neck 7, the minor end of which is fitted in the dash board 8 of the motor vehicle, in order that heated air therefrom will be discharged into the body of the vehicle.

Mounted in the casing 5 is a radiator 9 which is formed from suitable metal and has its sides shaped to provide vertically spaced corrugations 10 and resultant passages 11, the ends of said radiator being closed by plates 12. In order to maintain the radiator 9 in spaced relation with respect to the interior of the casing 5, the sides thereof have soldered or otherwise secured thereto, spacing strips 13, shaped as shown more clearly in Figures 5 of the drawings, two of such strips being located upon opposite sides of the radiator.

Extending longitudinally in the radiator 9 is a baffle member 14 which is substantially V-shaped in cross section, and has its lower edge suitably fixed to the bottom 15 of the radiator 9, the ends of said member being spaced from the plate 12, as shown more clearly in Figure 4 of the drawings. The forward end of the baffle member has extending therefrom a partition 16, and upon the opposite sides of which are arranged the inlet and outlet openings 17 and 18, respectively, thimbles 19 and 20 being fitted in said openings.

A flexible pipe 20' has its forward end connected with the thimble 19 in order that exhaust gases from the exhaust pipe 3 can be conducted therethrough into the radiator 9. A similar pipe 21 is connected to the thimble 20 and it is through this pipe that the exhaust gases are conducted from the radiator. This pipe is of such length that the exhaust gases will be conducted to a point rearwardly of the engine, so as not to be objectionable.

The pipe 20' may be connected directly with the exhaust pipe 3, but it is desired to provide some means for controlling the admittance of the exhaust gases through said pipe. In order to do this I have provided the exhaust pipe with an opening 22 and clamped thereon a housing 23, the rear end of which carries a tube 24 and to which the inner end of the pipe 20' is connected, as more clearly shown in Figure 2 of the drawings. The inner end of the tube constitutes a valve seat and cooperative therewith is a valve plate 25 having a stem 26 carried thereby, said stem slidable in a bearing 27 formed in the top of the housing. A coil spring 27' encircles the stem and serves to normally hold the plate seated upon the end of the tube 24. The tube 24 has a bracket 28 mounted thereon which pivotally supports a bell crank lever 29, one arm of which bears upon the stem 26, while the other arm thereof has connected thereto the forward end of a link 30, the rear end of said link being connected to a handle 31 carried by the dash 8 of the vehicle. Any suitable means may be employed for holding the handle in adjusted positions in order that the valve plate 25 can be adjusted to regulate the flow of exhaust gases from the housing through the pipe 20'. As shown in Figure 2 of the drawing, the tube 24 is closed by the plate 25, consequently the exhaust gases will pass through the pipe 3 to atmosphere. When it is desired to direct the hot gases into the radiator 9 the valve plate 25 is lowered through the medium of the bell crank lever 29. Obviously the gases will then pass through the pipe 20' and from thence into the radiator 9 and will follow a circuitous path around the baffle member 14 to the outlet pipe 21. The hot gases passing through the corrugations 10 will effectively heat the same in order that the air entering the forward end of the casing 4 and induced by the fan 2, will come in contact with the outer surfaces of the corrugations, thereby effectively heating the air before it enters the neck 7. By providing the radiator with a multiplicity of corrugations minimum space is utilized and maximum radiating surface is gained, thereby providing a heater which is comparatively small, yet capable of supplying considerable heat.

I prefer to construct the radiator as shown in Figure 5, but do not wish to be limited to any particular form of corrugation, since the form thereof may be varied without decreasing the efficiency of the heater.

Having thus described the invention, I claim:

1. A heater for automobiles comprising a casing, a radiator mounted in the casing and having its side walls provided with vertically spaced corrugations, and resultant spaces, plates for closing the ends of the radiator and corrugations, a baffle member disposed longitudinally within the radiator and spaced from the corrugations thereof, a partition connecting one end of the baffle plate with one end wall of the radiator and means for conducting the exhaust gases from the automobile engine to the radiator and discharging the same therefrom.

2. A heater for automobiles comprising a casing, a neck forming a part of the casing and extending rearwardly therefrom, a radiator mounted in the casing, said radiator having its walls provided with corrugations, spacing strips carried by the corrugations for engagement with the adjacent walls of the casing to maintain the radiator in spaced relation with respect thereto, a baffle member located in the radiator, and means for conducting exhaust gases from the engine of the automobile into the radiator and for conducting it therefrom.

In testimony whereof I affix my signature.

CHARLES E. BURRELL. [L. S.]